(12) United States Patent
O'Brien et al.

(10) Patent No.: US 10,663,389 B2
(45) Date of Patent: May 26, 2020

(54) SPECTROSCOPIC MEMBRANE PERMEATION CELL FOR SIMULTANEOUS MEASUREMENTS OF GAS PERMEATION RATES AND INFRARED REFLECTION ABSORPTION SPECTROSCOPIC ANALYSIS OF MEMBRANE SURFACES

(71) Applicant: U.S. Army Research Laboratory ATTN: RDRL-LOC-I, Adelphi, MD (US)

(72) Inventors: Casey P. O'Brien, Granger, IN (US); Ivan C. Lee, Burtonsville, MD (US); Zachary W. Dunbar, Annandale, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 188 days.

(21) Appl. No.: 15/939,333

(22) Filed: Mar. 29, 2018

(65) Prior Publication Data
US 2019/0301992 A1 Oct. 3, 2019

(51) Int. Cl.
*B01D 53/22* (2006.01)
*G01N 15/08* (2006.01)
(Continued)

(52) U.S. Cl.
CPC ....... *G01N 15/0826* (2013.01); *B01D 53/228* (2013.01); *B01D 65/10* (2013.01);
(Continued)

(58) Field of Classification Search
CPC ...... B01D 53/22; B01D 53/228; B01D 65/10; B01D 71/02; B01D 71/022; G01N 15/00;
(Continued)

(56) References Cited

U.S. PATENT DOCUMENTS 5,131,261 A * 7/1992 Tou .................. G01N 15/08
 73/38
5,478,444 A * 12/1995 Liu ................... B01D 53/326
 204/295

(Continued)

*Primary Examiner* — Nguyen Q. Ha
(74) *Attorney, Agent, or Firm* — Emily C. Moscati; Robert Thompson

(57) ABSTRACT

A permeation cell device includes a body component, a wire mesh support structure positioned in the body component, a membrane over the wire mesh support structure, a pair of compressible gaskets sandwiching the membrane, and a flange compressing the membrane. A spectroscopic device contains the permeation cell device. At least one mechanism simultaneously performs an infrared-reflection absorption spectroscopic analysis of a surface of the membrane as a fluid permeates on the membrane and measures a trans-membrane fluid permeation rate across the membrane. The wire mesh support structure may be configured to provide mechanical support to the non-opaque membrane at a pressure of at least 1 atm. The permeation cell device and the spectroscopic device may collectively create a pair of separate isolated compartments. The body component may include a material that is non-permeable to the fluid.

20 Claims, 13 Drawing Sheets

(51) Int. Cl.
  *B01D 71/02*  (2006.01)
  *B01D 65/10*  (2006.01)
  *G01N 21/3504*  (2014.01)
  *G01N 21/35*  (2014.01)

(52) U.S. Cl.
  CPC ....... *B01D 71/022* (2013.01); *G01N 15/0806* (2013.01); *G01N 21/3504* (2013.01); *G01N 2021/3595* (2013.01)

(58) Field of Classification Search
  CPC .............. G01N 15/08; G01N 15/0806; G01N 15/0826; G01N 21/3504; G01N 2021/3595
  See application file for complete search history.

(56) References Cited

U.S. PATENT DOCUMENTS

| | | | |
|---|---|---|---|
| 7,555,934 B2* | 7/2009 | DeRoos | G01N 15/0826 73/38 |
| 2011/0063609 A1* | 3/2011 | Ito | G01J 3/02 356/300 |
| 2013/0075331 A1* | 3/2013 | Peiris | B01D 61/12 210/636 |
| 2018/0200675 A1* | 7/2018 | Ahn | B01D 71/70 |
| 2018/0272288 A1* | 9/2018 | Choi | B01D 53/228 |

\* cited by examiner

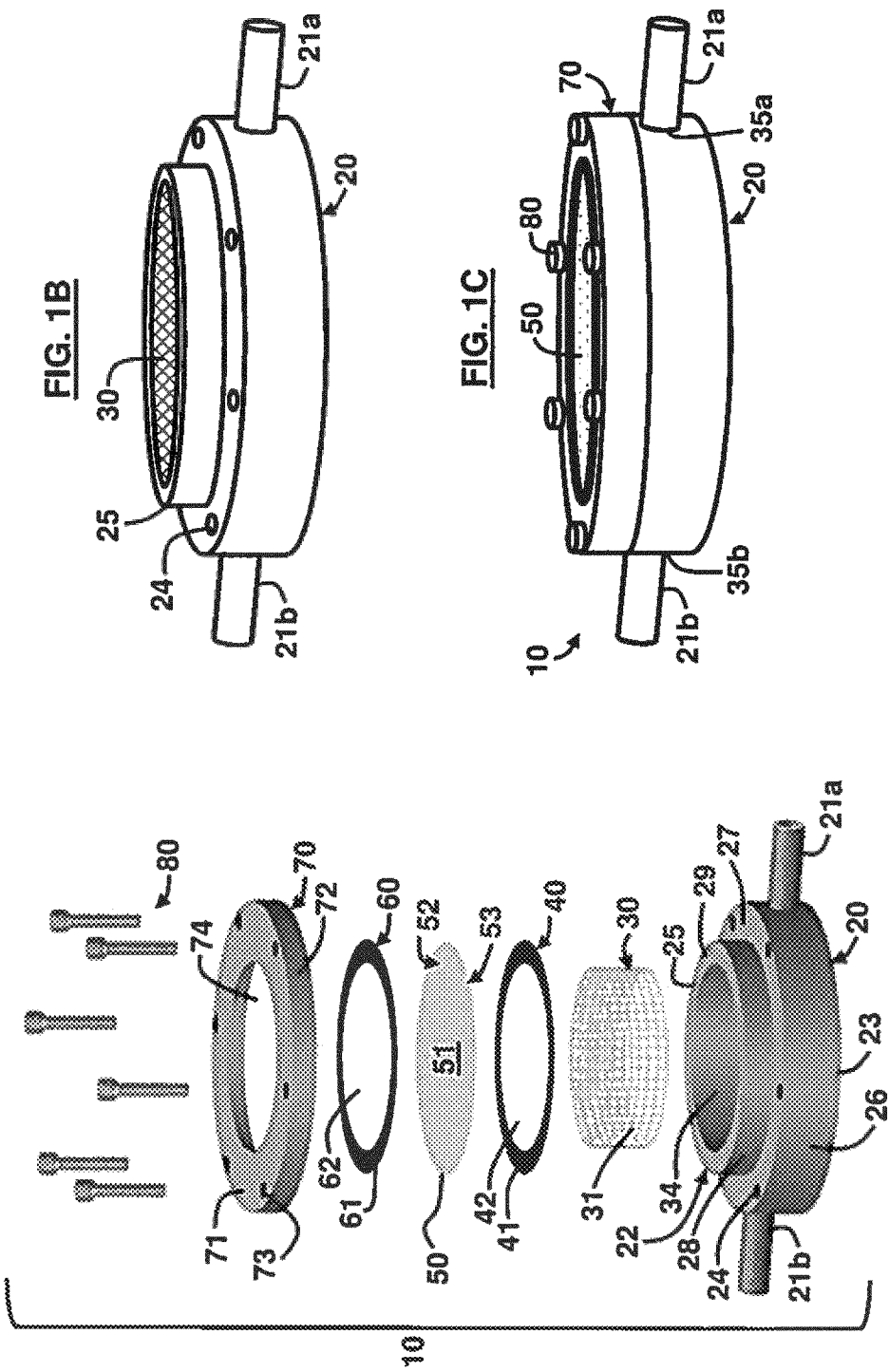

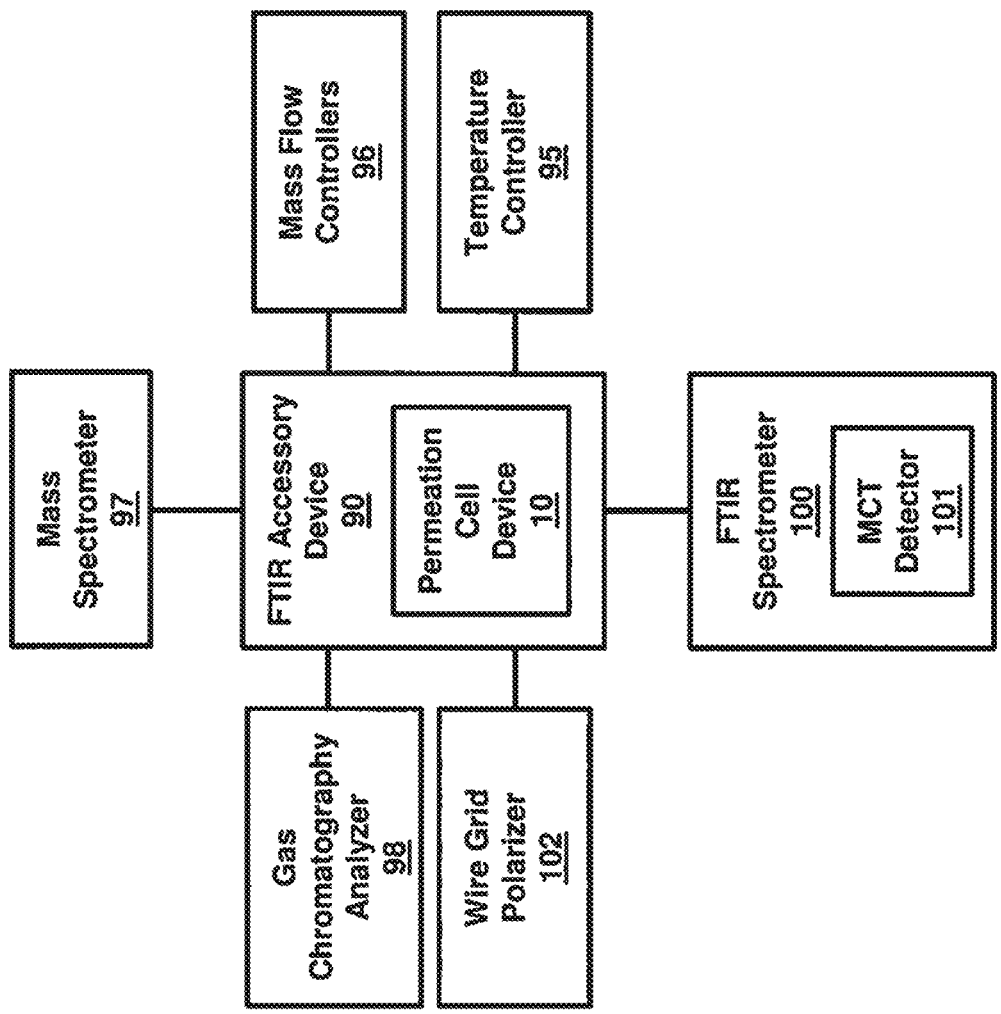

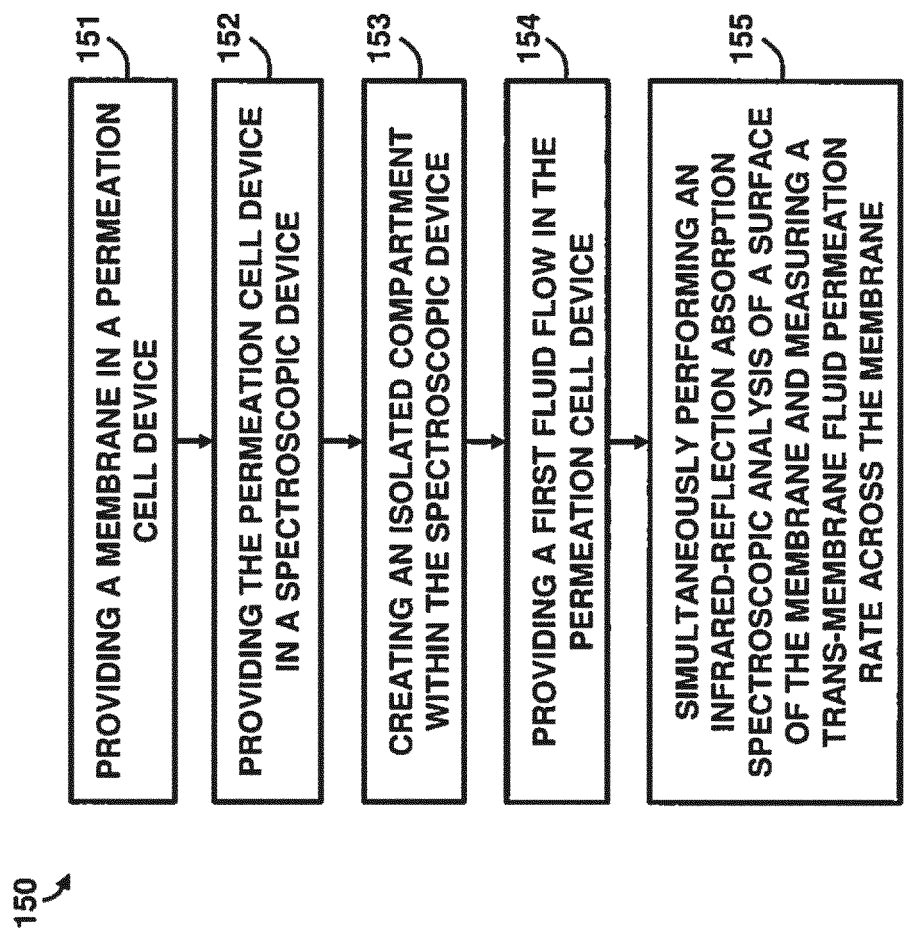

SPECTROSCOPIC MEMBRANE PERMEATION CELL FOR SIMULTANEOUS MEASUREMENTS OF GAS PERMEATION RATES AND INFRARED REFLECTION ABSORPTION SPECTROSCOPIC ANALYSIS OF MEMBRANE SURFACES

GOVERNMENT INTEREST

The embodiments described herein may be manufactured, used, and/or licensed by or for the United States Government without the payment of royalties thereon.

BACKGROUND

Technical Field

The embodiments herein generally relate to membrane permeation analysis, and more particularly to spectroscopic analysis techniques for membrane permeation.

Description of the Related Art

Dense Pd-based membranes are promising materials for hydrogen separation applications, such as hydrogen purification and catalytic membrane reactors, due to their near-infinite selectivity to hydrogen separation and their high hydrogen permeability. The near-infinite selectivity of dense metal membranes results from their ability to transport only H atoms, which are produced from $H_2$ dissociation on the membrane's catalytically active surface, across the bulk of the membrane. These membranes are particularly attractive options for catalytic membrane reactors which combine reaction and separation in one unit process. Selective removal of hydrogen from the reactant/product gas mixture could improve reactant conversion in thermodynamically-limited reactions such as water-gas shift and dehydrogenation reactions. However, the rate of hydrogen permeation across Pd-based membranes may be severely retarded by small concentrations of elements such as sulfur, nitrogen, and carbon-containing compounds, which has generally prevented their commercial applications.

Sulfur, nitrogen, and carbon-containing compounds may inhibit hydrogen transport across Pd-based membranes by weakly adsorbing on the membrane surface and blocking $H_2$ dissociation sites, which is reversible, or by reacting irreversibly with the membrane to form compounds which can poison the catalytic activity of its surface or reduce the H atom permeability of its bulk material. The blocking of $H_2$ dissociation sites by weak adsorption of co-adsorbates such as CO is relatively well-understood and may be modeled if the adsorption energies of the different co-adsorbates are known. Deactivation of Pd-based membranes by irreversible reaction with sulfur, nitrogen, and carbon-containing compounds is a far more serious problem than weak adsorption of co-adsorbates.

Except for a few cases in which bulk compounds have been detected following exposure of Pd membranes to $H_2S$ ($Pd_4S$) and CO (PdC), bulk compounds are rarely detected in the deactivated membranes and the deactivation results from small amounts of poisoning species concentrated at the membrane surface which are difficult to detect. The only methods currently available to membrane scientists for characterizing the poisoning species involve removing the deactivated membrane from the membrane testing apparatus and analyzing the membrane surface ex-situ with surface-sensitive techniques such as x-ray photoelectron spectroscopy.

SUMMARY

In view of the foregoing, an embodiment herein provides a method comprising providing a membrane in a permeation cell device; providing the permeation cell device in a spectroscopic device; creating an isolated compartment within the spectroscopic device, wherein the isolated compartment comprises a seal between the membrane and a portion of the permeation cell device; providing a first fluid flow in the permeation cell device; and simultaneously performing an infrared-reflection absorption spectroscopic analysis of a surface of the membrane and measuring a trans-membrane fluid permeation rate across the membrane.

The measuring of the trans-membrane fluid permeation rate may comprise flowing a predetermined amount of permeating fluid through the spectroscopic device; and measuring a concentration of the permeating fluid flowing out of the isolated compartment. The measuring of the trans-membrane fluid permeation rate may comprise flowing a predetermined amount of permeating fluid through the permeation cell device; and measuring a concentration of the permeating fluid flowing out of the spectroscopic device. The method may comprise providing a second fluid flow outside the permeation cell device but inside the spectroscopic device; and providing the first fluid flow on any of a permeate side and a retentate side of the membrane. The method may comprise switching a direction of permeation from either the isolated compartment to the spectroscopic device or vice versa. The method may comprise providing the first fluid flow at a pressure of at least 1 atm. The permeation cell device may comprise any of ceramic, plastic, and metal material. The membrane may comprise any of metal, ceramic, ceramic-metal composites, and plastic material.

Another embodiment provides a permeation cell device comprises a body component comprising a fluid inlet tube and a fluid outlet tube to permit a fluid flow through the body component; a wire mesh support structure positioned in the body component; a non-opaque membrane over the wire mesh support structure; a pair of compressible gaskets sandwiching the non-opaque membrane; and a flange retaining the membrane against the wire mesh support structure, wherein the body component is configured to be positioned within a spectroscopic device, and wherein the body component is configured to receive a first fluid flow and permit a simultaneous infrared-reflection absorption spectroscopic analysis of a surface of the non-opaque membrane and a measurement a trans-membrane fluid permeation rate across the non-opaque membrane.

The body component may comprise any of ceramic, plastic, and metal material. The non-opaque membrane may comprise any of metal, ceramic, ceramic-metal composites, and plastic material. The wire mesh support structure may be configured to provide mechanical support to the non-opaque membrane at a pressure of at least 1 atm. The pair of compressible gaskets may be configured to provide a seal between the non-opaque membrane and the body component to create an isolated compartment within the spectroscopic device. The flange may be configured to provide a uniform compression on the pair of compressible gaskets. The spectroscopic device may be configured to contain a second fluid flow outside the permeation cell device but inside the spectroscopic device, and the fluid inlet tube and a fluid outlet tube may be configured to permit the first fluid flow on any of a permeate side and a retentate side of the non-opaque membrane. The fluid flow may comprise any of hydrogen and helium gas.

Another embodiment provides a system comprising a permeation cell device comprising a body component; a wire mesh support structure positioned in the body component; a membrane over the wire mesh support structure; a pair of compressible gaskets sandwiching the membrane; and a flange compressing the membrane. The system further comprises a spectroscopic device containing the permeation cell device; and at least one mechanism to simultaneously perform an infrared-reflection absorption spectroscopic analysis of a surface of the membrane as a fluid permeates on the membrane and a measurement a trans-membrane fluid permeation rate across the membrane. The wire mesh support structure may be configured to provide mechanical support to the non-opaque membrane at a pressure of at least 1 atm. The permeation cell device and the spectroscopic device may collectively create a pair of separate isolated compartments. The body component may comprise a material that is non-permeable to the fluid.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1A is a schematic diagram illustrating an exploded view of a spectroscopic membrane permeation cell, according to an embodiment herein;

FIG. 1B is a schematic diagram illustrating a partially assembled spectroscopic membrane permeation cell, according to an embodiment herein;

FIG. 1C is a schematic diagram illustrating an assembled spectroscopic membrane permeation cell, according to an embodiment herein;

FIG. 2B is a block diagram of a system, according to an embodiment herein;

FIG. 12 is a flow diagram illustrating a method, according to an embodiment herein.

DETAILED DESCRIPTION

Figure 2A:
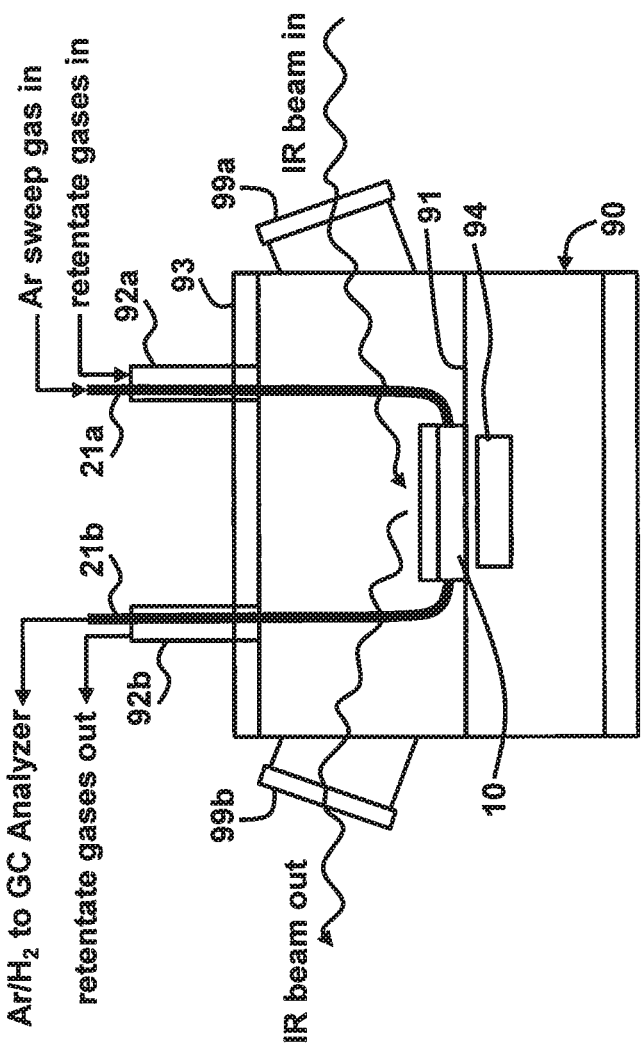
FIG. 2A is a schematic diagram illustrating the spectroscopic membrane permeation cell of FIG. 1C positioned inside a reactor grazing angle Fourier-transform infrared spectroscopy (FTIR) accessory, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a tool that may analyze the structure of a membrane surface in-situ while simultaneously measuring the rate of hydrogen permeation across the membrane would allow for detailed correlations to be made between the surface structure and the rate of hydrogen permeation across the membrane during deactivation. This tool may vastly improve a membrane scientist's ability to elucidate deactivation mechanisms and engineer new membrane materials that are resistant to deactivation.

According to the embodiments herein, the spectroscopic membrane permeation cell allows the rate of hydrogen permeation across Pd-based membranes, for example, to be measured while the surface of the membrane is analyzed by infrared reflection-absorption spectroscopy (IRAS) simultaneously. In an example, the performance of the cell is evaluated during exposure of a 25-µm-thick Pd membrane to $H_2$/CO gas mixtures.

The permeation cell may accurately measure the rate of $H_2$ permeation across a 25-µm-thick Pd membrane in the absence of CO, detect sub-monolayer coverages of CO on the membrane surface at elevated temperatures, and measure the rate of $H_2$ permeation across the membrane while simultaneously detecting surface-adsorbed CO during exposure to $H_2$/CO gas mixtures at elevated temperatures. According to some examples, the Pd membrane is irreversibly deactivated by exposure to $H_2$/CO gas mixtures with CO concentrations greater than 2% at 533 K. IRAS results indicate that the deactivation may result from modification of the membrane surface by CO dissociation and deposition of C atoms. Referring now to the drawings, and more particularly to FIGS. 1A through 12, where similar reference characters denote corresponding features consistently throughout the figures, there are shown exemplary embodiments. Various dimensions, shapes, configurations, and material compositions are described in the examples below. However, the embodiments herein are not restricted to these particular dimensions, shapes, configurations, and material compositions.

FIG. 1A illustrates an exploded view of a spectroscopic membrane permeation cell device 10 according to an embodiment herein, which may be used to measure the rate of gas permeation across a reflective membrane 50 while simultaneously analyzing the surface of the membrane 50 with IRAS. The device 10 comprises a permeation cell body 20 with a pair of connected inlet/outlet sweep gas tubes 21a, 21b. The permeation cell body 20 further comprises a base portion 23 with a plurality of receiving holes 24 arranged in the base portion 23. The permeation cell body 20 also includes a rim 22 comprising a basin 34 that is configured in the base portion 23 with a wall 25 defining the edge of the basin 34. The basin 34 may be configured as a substantially hollow portion contained within the boundary defined by the wall 25.

The base portion 23 comprises a side surface 26 such that the tubes 21a, 21b are configured to attach to the side surface 26 of the base portion 23. Additionally, the base portion 23 comprises an upper surface 27 from which the wall 25 of the basin 34 upwardly extends therefrom. The receiving holes 24 may be configured in the upper surface 27 of the base portion 23 and extend downward into the base portion 23 at a predetermined distance. The wall 25 of the rim 22 comprises a side surface 28 and an upper surface 29 such that the width of the wall 25 defines the width of the upper surface 29. In an example, the base portion 23, basin 34, and wall 25 may be cylindrically configured, although other configurations are possible. In another example, the wall 25 is diametrically smaller than the base portion 23, and the basin 34 is diametrically smaller than the wall 25, although other respective configurations are possible. In an example, the height of the base portion 23 is greater than the height of the wall 25, although other configurations are possible.

A wire cage support 30, which may be composed of stainless-steel material, is configured to be inserted into the basin 34. In an example, the wire cage support 30 comprises a mesh body 31 configured to fully insert into the basin 34 such that the top 32 of the wire cage support 30 is substantially planar with the upper surface 29 of the wall 25. FIG. 1B, with reference to FIG. 1A, illustrates the wire cage support 30 inserted into the permeation cell body 20.

A pair of gaskets 40, 60, which may be composed of graphite are provided to sandwich a reflective membrane 50. In an example, the pair of gaskets 40, 60 may comprise substantially circular, ring-like configurations, although other configurations are possible. In an example, the first gasket 40 comprises a first ring portion 41 with a first opening 42 defining the thickness of the first ring portion 41. Similarly, the second gasket 60 comprises a second ring portion 61 with a second opening 62 defining the thickness of the second ring portion 62, according to an example. The first gasket 40 is configured is to be positioned on the rim 22, and more particularly on the upper surface 29 of the wall 25 such that the first opening 42 exposes the top 32 of the wire cage support 30.

The membrane 50 is configured to be positioned over the top 32 of the wire gage support 30 and the first gasket 40. In an example, the membrane 50 may comprise a substantially circular configuration comprising an outer surface 51. The membrane 50 may comprise a retentate (feed) side 52 and a permeate (sweep) side 53. The second gasket 60 is configured to be positioned over the membrane 50 such that the first gasket 40, membrane 50, and second gasket 60 are substantially aligned over the upper surface 29 of the wall 25 of the permeation cell body 20. The second opening 62 of the second gasket 60 exposes the outer surface 51 of the membrane 50.

A compression flange 70 is configured to be positioned over the second gasket 60. The compression flange 70 may comprise a substantially cylindrical configuration, according to an example, although other configurations are possible. The compression flange 70 may comprise an upper body 71 with a side wall 72 downwardly extending therefrom. A plurality of through holes 73 are configured through the upper body 71. A substantially central opening 74 is configured through the upper body 71, which creates a ring-like configuration for the upper body 71 thereby defining the width of the upper body 71. The side wall 72 of the compression flange 70 is further configured to rest on the upper surface 27 of the base portion 23 of the permeation cell body 20 such that the plurality of through holes 73 of the compression flange 70 align with the plurality of receiving holes 24 of the permeation cell body 20. The opening 74 of the compression flange 70 is configured to align with the second opening 62 of the second gasket 60 thereby exposing the outer surface 51 of the membrane 50.

A plurality of retaining members 80 are configured to be inserted in the through holes 73 and into the receiving holes 24 to retain the compression flange 70 to the permeation cell body 20, which further retains the wire cage support 30, first gasket 40, membrane 50, and second gasket 60 in or between the permeation cell body 20 and the compression flange 70. FIG. 1C, with reference to FIGS. 1A and 1B, illustrates the fully assembled spectroscopic membrane permeation cell device 10. In an example, the retaining members 80 may be configured as screws, bolts, pins, etc., which may be threaded to engage corresponding receiving threads (not shown) in the receiving holes 24 of the permeation cell body 20 to create a secured and tight retention of the compression flange 70 to permeation cell body 20.

In a manufacturing example, the permeation cell body 20 may be machined out of a stainless-steel cylinder (approximately 1.25 inches in diameter, and approximately 0.375 inches in height). The basin 34 may comprise an approximately 0.75 inches hole in diameter and approximately 0.25 inches deep and may be machined out of the center of the stainless-steel cylinder. The wall 25 may be configured as a concentric ring (approximately 1.25 inches outer diameter, approximately 1.00 inches inner diameter, and approximately 0.125 inches deep) may be machined out of the upper perimeter of the cylinder, leaving a rim 22 (approximately 0.75 inches inner diameter, approximately 1.00 inches outer diameter, and approximately 0.125 inches in height) for sealing the membrane 50. Two holes 35a, 35b approximately 0.125 inches in diameter may be drilled on opposite ends of the permeation cell body 20, from the side surface 26 through to the basin 34. The stainless-steel sweep gas tubes 21a, 21b (approximately 0.125 inches outer diameter, 0.028 inches wall thickness, 10 inches long) may be welded to each hole 35a, 35b to allow for gases to flow into and out of the basin 34. The receiving holes 24 may be drilled and tapped into the permeation cell body 20 at a height and thickness as desired to support the retaining members 80. The wire cage support 30 comprising the mesh body 31 (approximately 0.25-inch height, approximately 0.75-inch diameter) may be constructed of a sheet of stainless-steel mesh material (approximately 0.016 inch), which is configured to be placed inside of the basin 34 of the permeation cell body 20 to provide mechanical support to the membrane 50 without impeding the gas flow. The membrane 50 may comprise an approximately 1.00 inch diameter Pd foil (approximately 0.025 mm thick, 99.9% purity metals basis). The pair of graphite gaskets 40, 60 (approximately 1.00 inch outer diameter, approximately 0.75 inches inner diameter), may be punched out of an approximately 0.01 inch thick sheet of graphite material. The pair of gaskets 40, 60 may be compressed against the membrane 50 and the rim 22 of the permeation cell body 20 by fastening the compression flange 70 (approximately 1.25 inches outer diameter, approximately 0.75 inches inner diameter, approximately 0.1475 inches height) to the permeation cell body 20 with the retaining members 80. In an example, the retaining members 80 may comprise six screws (2-56, approximately 0.375 inch). The opening 74 of the compression flange 70 may be approximately 0.75 inches in diameter such that the opening 74 may be made by machining out of the interior of the compression flange 70, with the outer diameter of the compression flange approximately 1.25 inches. The height of the side wall 72 of the compression flange 70 may be approximately 0.1475 inches. The height of the upper body 71 of the compression flange 70 may be approximately 0.0335 inches above the surface 51 of the membrane 50, which may be selectively minimized to avoid interfering with the infrared beam path. The exposed area (i.e., exposed by the second opening 62 of the second gasket 60 and the opening 74 of the compression flange 70) of the surface 51 of the membrane 50 area may be approximately 0.75 inches.

FIG. 2A, with reference to FIGS. 1A through 1C, illustrates the spectroscopic membrane permeation cell device 10 positioned inside a FTIR accessory device 90. In an example, the device 90 may comprise a Harrick Refractor™ Reactor Grazing Angle FTIR accessory device. The permeation cell device 10 may be held in place on the sample stage 91 of the FTIR accessory device 90. In an example, a type K thermocouple (not shown) may be held on the upper body 71 of the compression flange 70 by one of the sample holders (not shown) of the FTIR accessory device 90. The Ar sweep gas tubes 21a, 21b may be bent upward to exit the FTIR accessory device 90 through a pair of ports 92a, 92b. The sweep gas tubes 21a, 21b may also be bent to avoid the infrared beam path. The permeation cell device 10 may be heated by heating thermal cartridges 94 positioned under the sample stage 91 of the FTIR accessory device 90. As shown in FIG. 2B, with reference to FIGS. 1A through 2A, the temperature may be controlled using a temperature controller 95. In an example, the temperature may be raised to approximately 573 K, although other temperatures may be achieved depending on the size/configuration of the thermal cartridges 94, etc.

Mass flow controllers 96 may be used to regulate the flow rates of all gases: Ar (99.999%), $N_2$ (99.999%), $O_2$ (99.999%), 10% CO in balance Ar, and $H_2$. The hydrogen gas may be generated by electrolytic dissociation of water in a hydrogen gas generator (not shown), which may have a purity rating of 99.999%, in an example. The retentate feed gases may enter the FTIR accessory device 90 through the annulus of a first port 92a extending from the lid 93 of the device 90. The gases that do not permeate across the membrane 50 exit the FTIR accessory device 90 through the annulus of the second port 92b extending from the lid 93. A mass spectrometer 97 may analyze the composition of the retentate gas exiting the FTIR accessory device 90. The hydrogen gas that permeates across the membrane 50 may be swept away from the surface 51 of the membrane 50 by an Ar sweep gas flowing through the sweep gas tubes 21a, 21b and exiting the FTIR accessory device 90 for analysis by a gas chromatography (GC) analyzer 98.

IRAS spectra may be collected with a FTIR spectrometer 100 equipped with a liquid nitrogen cooled mercury cadmium telluride (MCT) detector 101. The spectra may be collected with a spectral resolution of 2 $cm^{-1}$ and 128 scans-per-spectrum, for example. The infrared beam path is refracted by wedged ZnSe window 99a and is reflected off of the surface 51 of the membrane 50 at an angle of approximately 75° with respect to the normal. After reflection off the surface 51 of the membrane 50 and after exiting the FTIR accessory device 90 through the wedged ZnSe window 99b, the infrared beam passes through a wire grid polarizer 102 with the grids of the polarizer aligned such that only p-polarized light is transmitted.

In an example, prior to hydrogen permeation and IRAS measurements, the membrane 50 may be pre-treated in the FTIR accessory device 90 using the following example sequence of steps: (1) heat the membrane 50 from 25° C. to 300° C. while flowing 100 mL/min $N_2$ on the retentate (feed) side 52 of the membrane 50 and 100 mL/min Ar on the permeate (sweep) side 53 of the membrane 50; (2) flow 20 mL/min of $O_2$ (retentate side 52), 80 mL/min $N_2$ (retentate side 52), and 100 mL/min Ar (permeate side 53) at 300° C. for 16 hours; (3) purge the FTIR accessory device 90 with 100 mL/min $N_2$ (retentate side 52) and 100 mL/min Ar (permeate side 53) for 5 minutes; (4) flow 20 mL/min $H_2$ (retentate), 80 mL/min $N_2$ (retentate side 52), and 100 mL/min Ar (permeate side 53) at 300° C. for 3 hours; (5) purge the FTIR accessory device 90 with 100 mL/min $N_2$ (retentate side 52) and 100 mL/min Ar (permeate side 53) for 5 minutes.

To be effective for correlating surface processes measured by FTIR spectroscopy to the macroscopic rate of hydrogen transport across the membrane 50, the permeation cell device 10 measures the rate of hydrogen permeation accurately. To verify that the permeation cell device 10 can measure hydrogen permeation accurately, an experimental process was conducted whereby the hydrogen permeability of a 25-μm-thick Pd foil membrane 50 was measured in the 433-573 K temperature range.

Following the membrane pre-treatment process, as described above, $H_2$ gas was introduced with $N_2$ on the retentate side 52 of the membrane 50 while an Ar sweep gas was flowing on the permeate side 53 of the membrane 50. The partial pressure of $H_2$ on the retentate side 52 of the membrane 50 was controlled by varying the flow rate of $H_2$ in the feed gas from 100 mL/min up to 400 mL/min in 50 mL/min increments while the total flow rate was held constant at 400 mL/min by varying the $N_2$ flow rate from 300 mL/min down to 0 mL/min. The total pressure of the retentate gas was 1 atm. The rate of $H_2$ permeation across the membrane 50 was measured by the GC analyzer 98, which analyzed the $H_2$ concentration in the Ar sweep gas on the permeate side 53 of the membrane 50, according to Equation (1):

$$J_{H_2} = \frac{F_{Ar} \cdot C_{H_2} \cdot P}{R \cdot T \cdot A}$$

where $J_{H_2}$ represents the $H_2$ flux (mol/m²/s), $F_{Ar}$ represents the Ar sweep gas flow rate (mL/s), $C_{H_2}$ represents the fraction of $H_2$ in the sweep gas from the analysis provided by the GC analyzer 98, P represents the pressure (1 atm), R represents the universal gas constant (82.06 mL·atm/mol/K), T represents the temperature of the gas (298 K), and A represents the active membrane surface area (2.85·10⁻⁴ m²). The hydrogen permeability of Pd was calculated according to Equation (2):

$$k_{Pd} = \frac{J_{H2} \cdot x_{Pd}}{\Delta P_{H2}^{1/2}}$$

where $k_{Pd}$ represents the hydrogen permeability of Pd (mol/m/s/Pa$^{1/2}$), $x_{Pd}$ represents the thickness of the membrane (2.5×10⁻⁵ m), and $\Delta P_{H2}^{1/2}$ represents the difference in the square root of the hydrogen partial pressure across the membrane (Pa$^{1/2}$). According to Equation (3):

$$\Delta P_{H2}^{1/2} = P_{H2,ret}^{1/2} - P_{H2,perm}^{1/2}$$

where $P_{H2,ret}^{1/2}$ represents the partial pressure of hydrogen on the retentate side 52 of the membrane 50 (Pa) and $P_{H2,perm}^{1/2}$ represents the hydrogen partial pressure on the permeate side 53 of the membrane 50 (Pa). The partial pressure of hydrogen on the permeate side 53 of the membrane 50 was measured from the analysis of the GC analyzer 98 of the hydrogen concentration in the Ar sweep gas, which was at atmospheric pressure.

Figure 3:
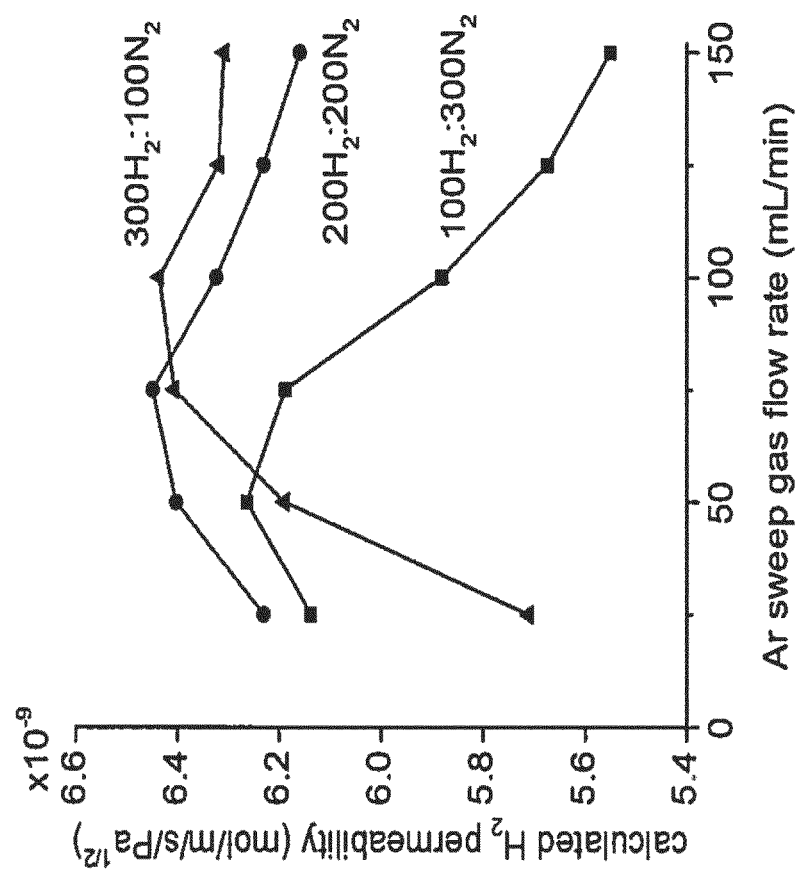
FIG. 3 is a graph illustrating the calculated $H_2$ permeability versus Ar sweep gas flow rate for three different retentate feed gas conditions, according to an embodiment herein.

To determine whether the measured hydrogen permeation rates are influenced by concentration gradients in the gas phase, the Ar sweep gas flow rate was varied from 25 mL/min up to 150 mL/min in 25 mL/min increments for each $H_2$:$N_2$ retentate feed gas ratio. If there are no concentration gradients in the gas-phase, then the hydrogen permeability calculated from the measured $H_2$ flux and hydrogen partial pressures, according to Equation (2), should be independent of the Ar sweep gas flow rate. FIG. 3, with reference to FIGS. 1A through 2B, shows the calculated $H_2$ permeability versus the Ar sweep gas flow rate with three different $H_2$:$N_2$ ratios in the retentate gas at 533 K. There is clearly some variation in the calculated $H_2$ permeability with changing Ar sweep gas flow rate. With the highest concentration of $H_2$ in the retentate feed gas (300$H_2$:100$N_2$), the calculated $H_2$ permeability increases by ~10% when increasing the Ar sweep gas flow rate from 25 mL/min up to 75 mL/min, and then remains relatively constant at ~6.3×10⁻⁹ mol/m/s/Pa$^{1/2}$ up to 150 mL/min. The opposite trend is observed with the lowest concentration of $H_2$ in the retentate feed gas (200$H_2$:300$N_2$), where the calculated $H_2$ permeability is nearly constant at ~6.2×10⁻⁹ mol/m/s/Pa$^{1/2}$ between 25 and 75 mL/min and then decreases by ~10% when increasing the flow rate up to 150 mL/min. At the intermediate hydrogen concentration in the retentate gas (200$H_2$:200$N_2$), the calculated $H_2$ permeability is relatively constant over the entire range of Ar sweep gas flow rates at ~(6.3±0.1)×10⁻⁹ mol/m/s/Pa$^{1/2}$. Similar trends in the calculated $H_2$ permeability versus sweep gas flow rates were observed in the entire 433-573 K temperature range. These results clearly indicate that the measured hydrogen permeation rates are influenced to some extent by concentration gradients in the gas phase. However, as described below the influence of these concentration gradients on the rate of hydrogen transport across the membrane 50 is relatively small.

Figure 4B:
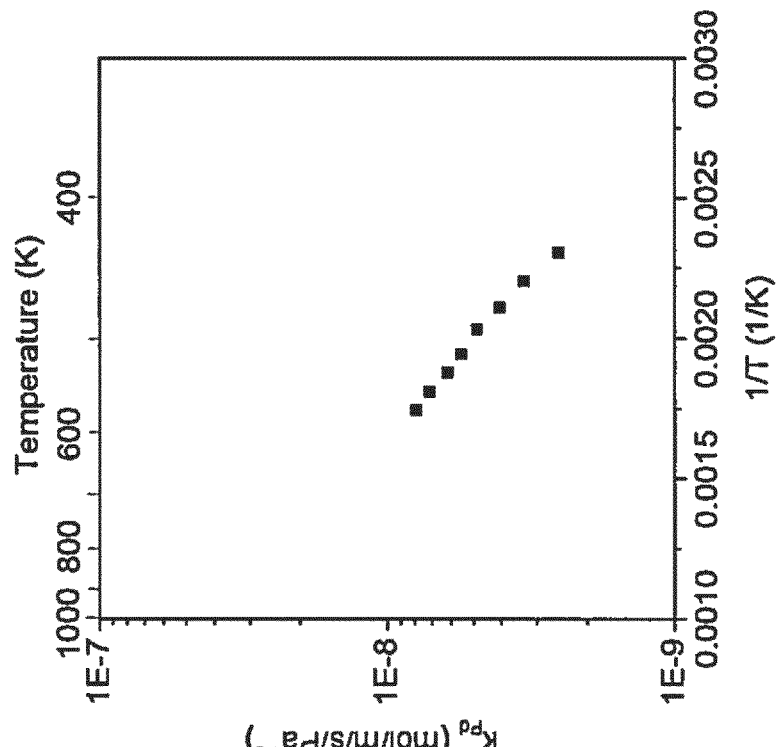
FIG. 4B is a graph illustrating an Arrhenius plot of the $H_2$ permeability of Pd measured, according to the embodiments herein.
Figure 4A:
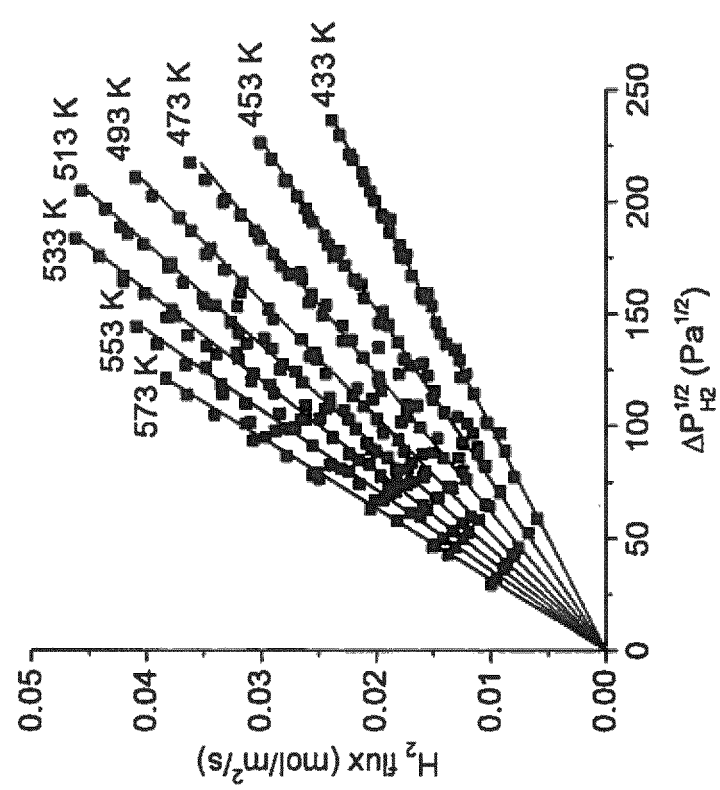
FIG. 4A is a graph illustrating the measured $H_2$ flux across a 25-µm-thick Pd foil membrane versus the difference in the square root of the hydrogen partial pressure across the membrane in the 433-573 K temperature range, according to an embodiment herein.
Figure 5B:
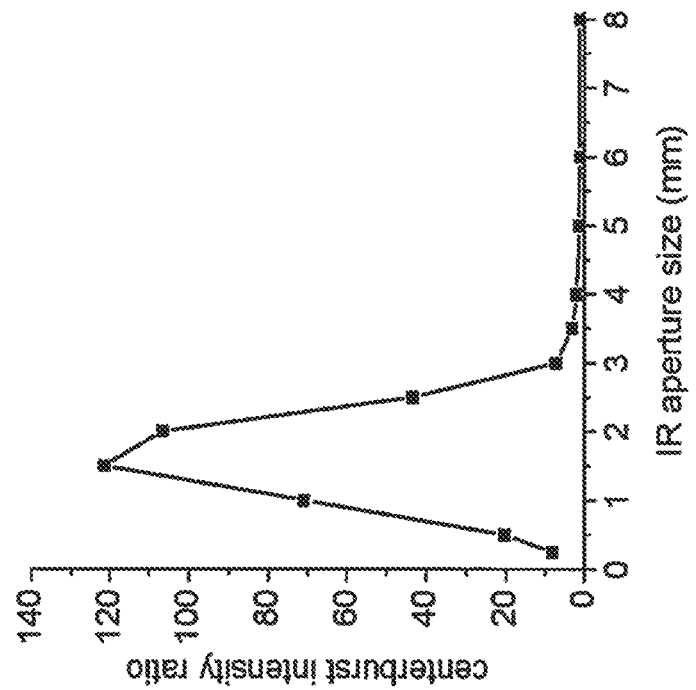
FIG. 5B is a graph illustrating the ratio of the centerburst intensity with the membrane to that without the membrane versus IR aperture size, according to the embodiments herein.
Figure 5A:
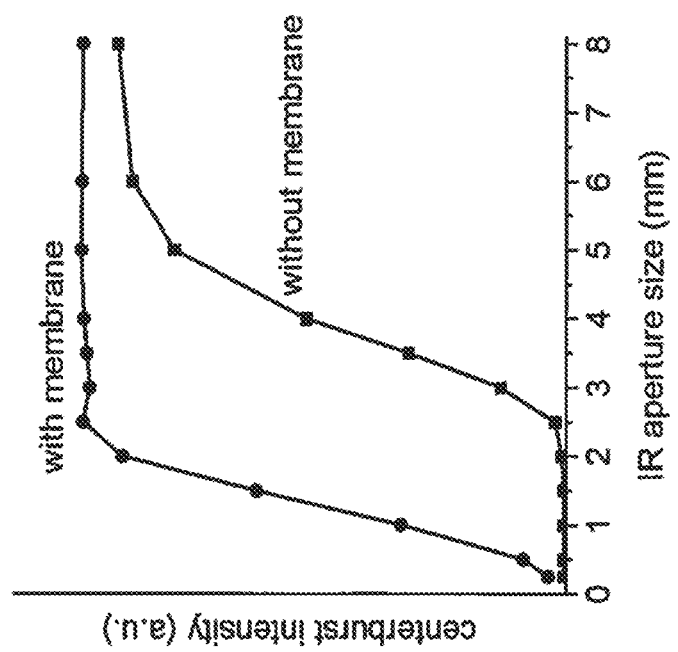
FIG. 5A is a graph illustrating the intensity of the interferogram centerburst after reflection off of the membrane permeation cell with the membrane and without the membrane versus IR aperture size, according to the embodiments herein.

If the rate of hydrogen atom diffusion through the bulk of the Pd membrane 50 limits the overall rate of $H_2$ transport across the membrane 50, then according to Equation (2), the hydrogen flux should be proportional to the difference in the square root of the hydrogen partial pressure across the membrane ($\Delta P_{H2}^{1/2}$), with a slope that is equal to the permeability divided by the thickness of the membrane 50. FIG. 4A, with reference to FIGS. 1A through 3, shows the $H_2$ flux across the 25-µm-thick Pd membrane 50 versus $\Delta P_{H2}^{1/2}$ in the 433-573 K temperature range. $H_2$ fluxes were measured over a range of $H_2$:$N_2$ feed gas ratios from 100:300 up to 400:0, and with a range of Ar sweep gas flow rates from 25 up to 150 mL/min for each feed gas ratio. The measured $H_2$ fluxes in FIG. 4A are linearly dependent on $\Delta P_{H2}^{1/2}$, indicating that the rate of $H_2$ permeation is limited by the rate of hydrogen diffusion. Using the slopes of the linear fits in FIG. 4A, the $H_2$ permeability of Pd was calculated at each temperature. FIG. 4B, with reference to FIGS. 1A through 4A, shows an Arrhenius plot of the measured $H_2$ permeability of Pd. This result indicates that, although the rate of $H_2$ permeation across the membrane 50 is influenced to some extent by concentration gradients in the gas-phase, the device 10 may be used to measure $H_2$ permeation rates accurately.

As described above, the permeation cell device 10 may be used to accurately measure hydrogen permeation rates across a 25 µm-thick Pd foil membrane 50. The next benchmark in establishing the usefulness of the device 10 is to demonstrate whether it may be used with IRAS to detect chemical species adsorbed on the surface 51 of the membrane 50 at elevated temperatures and pressures.

Before detecting species adsorbed on the surface 51 of the membrane 50 with IRAS, it is verified that the infrared beam is reflected off of the surface 51 of the membrane 50 only, and not off of the compression flange 70, to be sure that the chemical species detected by IRAS are bound to the surface 51 of the membrane 50 and not to the compression flange 70. The aperture size of the infrared spectrometer 100 should be carefully chosen such that the spot size on the surface 51 of the membrane 50 is large enough to obtain sufficient signal intensity, yet not so large that the infrared beam reflects off of the compression flange 70. To determine which aperture size is optimal, the intensity of the centerburst in the interferogram was measured as a function of aperture size, both with and without the membrane 50 in the permeation cell device 10. In both cases, the compression flange 70 was attached to the permeation cell device 10. The results are displayed in FIG. 5A, with reference to FIGS. 1A through 4B. With the membrane 50 in the permeation cell device 10, the centerburst intensity increases monotonically with increasing aperture size until the signal is saturated at aperture sizes of 2.5 mm and higher. Without the membrane 50 in the permeation cell device 10, the centerburst intensity is nearly zero for all aperture sizes smaller than 2 mm, and begins to increase sharply with increasing aperture size for aperture sizes greater than 2.5 mm. This indicates that the infrared beam is reflecting off of the compression flange 70 for aperture sizes greater than about 2 mm. The ratio of the centerburst intensity measured with the membrane 50 in the permeation cell device 10 to that measured without the permeation cell device 10 (centerburst intensity ratio) is displayed in FIG. 5B, with reference to FIGS. 1A through 5A. The centerburst intensity ratio increases with increasing aperture size up to a maximum at an aperture size of 1.5 mm, and then begins to decrease with increasing aperture size as the infrared reflection off of the compression flange 70 becomes more significant. These results indicate that infrared reflection off of the compression flange 70 contributes significantly to the signal intensity for aperture sizes greater than 1.5 mm, and the optimal aperture size, which gives sufficient signal intensity without contributions from the compression flange 70, is 1 or 1.5 mm. In the experiments, an aperture size of 1 mm was used because it provides sufficient signal intensity and it may be safely assumed that the infrared reflection off of the compression flange 70 did not contribute significantly to the signal.

Figure 6:
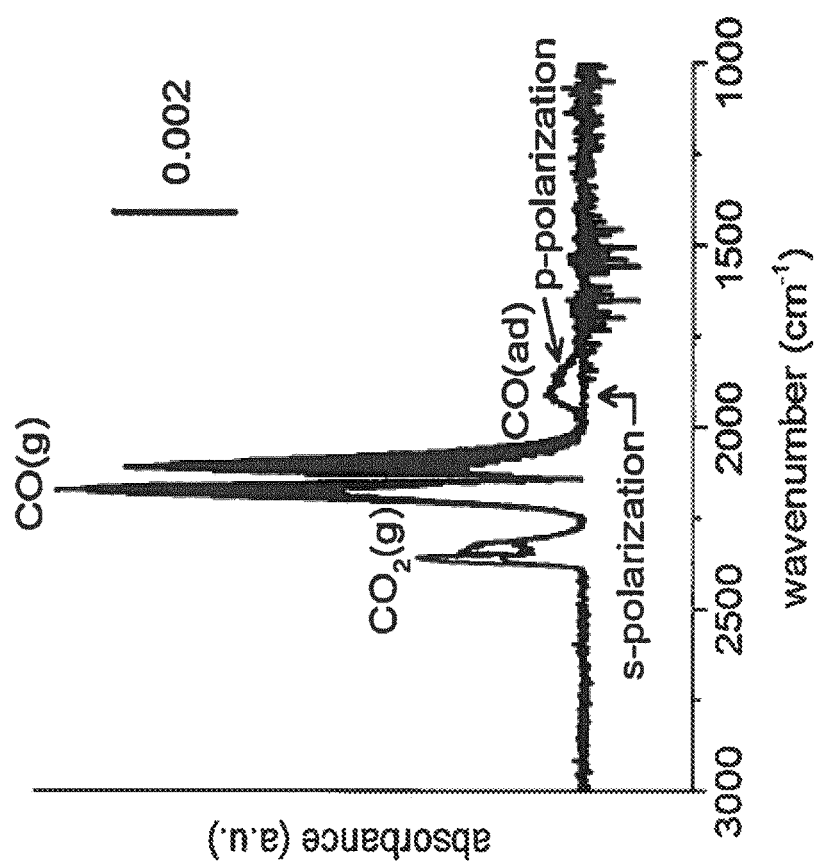
FIG. 6 is a graph illustrating infrared reflection-absorption spectroscopy (IRAS) of a 25-µm-thick Pd foil membrane during exposure to a gas mixture composed of 0.1% CO, 0.9% Ar, and 99% $N_2$ at 533 K with infrared light that is transmitted with s-polarization and p-polarization, according to the embodiments herein.
Figure 7:
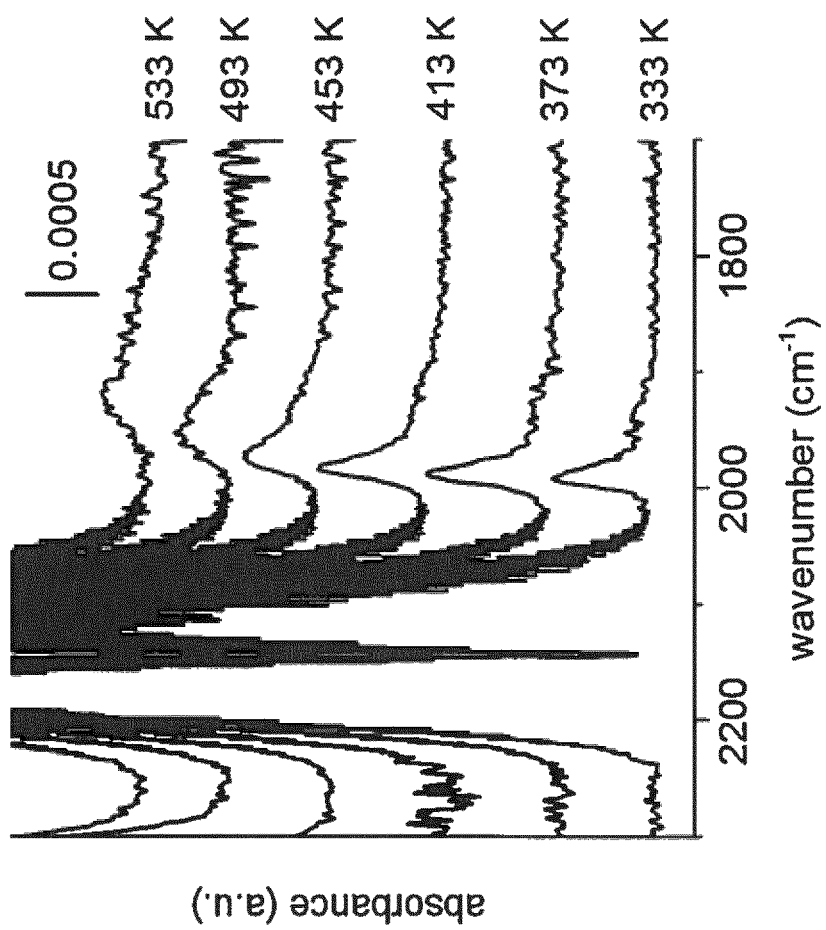
FIG. 7 is a graph illustrating IRAS of a 25-µm-thick Pd foil membrane during exposure to a gas mixture composed of 0.1% $CO_3$ 0.9% Ar, and 99% $N_2$ in the 333 to 533 K temperature range, according to the embodiments herein.

To demonstrate that the membrane permeation cell device 10 may be used with IRAS to detect chemical species on the surface 51 of the membrane 50, IRAS was performed while exposing a 25-μm-thick Pd foil membrane 50 to a gas mixture containing CO and other non-adsorbing gases. Following the same sequence of pre-treatment steps described above, the membrane 50 was cooled to 533 K, and a background IRAS spectrum was collected while flowing 100 mL/min $N_2$ on the retentate side 52 of the membrane 50 and 100 mL/min Ar on the permeate side 53. After the background spectrum was collected, a gas mixture composed of 10% CO in Ar was introduced to the retentate side 52 with a flowrate of 1 mL/min and the $N_2$ flowrate in the retentate side 52 was reduced to 99 mL/min. FIG. 6, with reference to FIGS. 1A through 5B, shows the IRAS spectrum collected during exposure of the Pd membrane 50 to the 0.1% CO/0.9% Ar/99% $N_2$ gas mixture. There are three main regions in the IRAS spectrum displayed in FIG. 6. The bands in the ~2300-2400 $cm^{-1}$ region and in the ~2020-2250 $cm^{-1}$ region are associated with gas-phase $CO_2$ and gas-phase CO, respectively. The broad band in the ~1750-2000 $cm^{-1}$ region is associated with CO adsorbed on the surface 51 of the membrane 50. To further support the assignment of the broad band in the 1750-2000 $cm^{-1}$ region to surface-adsorbed CO, the CO-IRAS experiment was repeated with identical conditions except that the orientation of the wire grid polarizer 102 was changed so that only s-polarized light is transmitted. It is well known that molecules adsorbed on metal surfaces are not expected to absorb light that is s-polarized whereas significant absorption of p-polarized light is expected at high angles of incidence. FIG. 6 shows a comparison of the spectra collected during exposure of the Pd membrane 50 to the 0.1% CO/0.9% Ar/99% $N_2$ gas mixture at 533 K with infrared light that is transmitted with s-polarization and p-polarization. The bands associated with gas-phase $CO_2$ and CO are similar in the spectra collected with s-polarization and p-polarization. The band associated with CO adsorbed on the Pd membrane 50 at ~1920 $cm^{-1}$, however, is absent in the spectrum collected with the polarizer 102 transmitting only s-polarization. This result clearly indicates that the broad band in the 1750-2000 $cm^{-1}$ region is associated with CO adsorbed on the surface 51 of the membrane 50.

The influence of temperature on the adsorption of CO on the surface 51 of the membrane 50 was investigated by collecting IRAS spectra during exposure of the Pd membrane 50 to the gas mixture composed of 0.1% CO, 0.9% Ar, and 99% $N_2$ in the 333-533 K temperature range. CO-IRAS spectra were first collected at 533 K, and then CO-IRAS spectra were collected at decreasing temperature down to 333 K. The results are displayed in FIG. 7, with reference to FIGS. 1A through 6. There is a significant temperature-dependence in the CO-IRAS spectra, and is related to an increase in the CO coverage as the temperature decreases from 533 K to 333 K. At 533 K, there is a broad band with a maximum near 1920 $cm^{-1}$, which becomes sharper and shifts to higher wavenumbers with decreasing temperature. CO is most likely adsorbed on bridging sites on the surface 51 of the membrane 50 in the entire 333 to 533 K temperature range. The shift to higher wavenumber with increasing CO coverage is due to lateral interactions between adsorbed CO molecules and the decrease in the band width is due to ordering of the adsorbed CO molecules. At 333 K, the bridging CO band is centered at ~1990 $cm^{-1}$, which is consistent with CO adsorbed on bridging sites on Pd(100) or "defect-rich" Pd(111) facets on the surface 51 of the membrane 50. The integral area of the bridging CO band increases with decreasing temperature from 533 K to 373 K; however, there is a slight decrease in its integral area when decreasing the temperature from 373 K to 333 K. This behavior has also been observed during exposure of Pd(100) to CO at elevated temperatures and pressures and was attributed to a transition to a compressed overlayer structure at a coverage of ~0.5 ML. Based on this observation, it is estimated that the CO coverage at 333 K is between 0.5 ML and 0.8 ML, which is the maximum CO coverage. These results clearly demonstrate that the spectroscopic membrane permeation cell device 10 may be used with a FTIR accessory device 90 such as a Harrick Refractor® Reactor to detect sub-monolayer coverages of species adsorbed on the surface 51 of the membrane 50 at elevated temperatures and pressures.

Figure 8A:
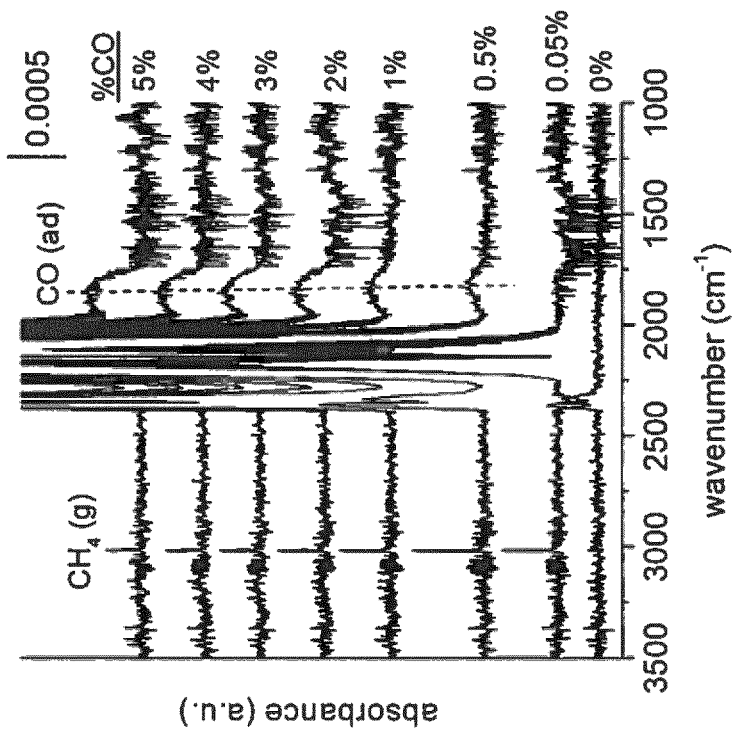
FIG. 8A is a graph illustrating $H_2$ flux across a 25-µm-thick Pd foil membrane at 533 K during exposure to a gas mixture with 50% $H_2$ and 0%, 0.05%, 0.5%, 1%, 2%, 3%, 4%, and 5% CO, according to the embodiments herein.

The third and final benchmark in demonstrating the capabilities of the spectroscopic membrane permeation cell device 10 is to measure hydrogen permeation rates across the Pd membrane 50 while simultaneously analyzing the surface 51 of the membrane 50 by IRAS. Baseline hydrogen permeation rates and IRAS spectra were collected by exposing a 25-μm-thick Pd foil membrane 50 to a gas mixture composed of 50% $H_2$ and 50% $N_2$ with a total flow rate of 200 mL/min and an Ar sweep gas flow rate of 100 mL/min at 533 K. After a steady $H_2$ flux and a stable IRAS background was established over ~30 minutes of $H_2/N_2$ exposure at 533 K, a gas mixture composed of 10% CO in balance Ar was introduced to the retentate gas mixture with a flow rate of 1 mL/min. The flow rate of $H_2$ in the retentate gas was held constant at 100 mL/min and the total flow rate of the retentate gas was held constant at 200 mL/min by decreasing the $N_2$ flow rate from 100 mL/min to 99 mL/min. The resulting CO concentration in the retentate gas was 0.05%. After ~15 minutes of exposure to the retentate gas mixture with 0.05% CO, the CO concentration in the retentate was increased to 0.5% by increasing the flow rate of the 10% CO/Ar gas mixture to 10 mL/min and decreasing the $N_2$ flow rate to 90 mL/min. The CO concentration in the retentate gas was increased every ~15 minutes by increasing the flow rate of the 10% CO/Ar gas mixture while the $H_2$ flow rate and the total flow rate were held constant at 100 mL/min and 200 mL/min, respectively. FIG. 8A, with reference to FIGS. 1A through 7, shows the $H_2$ flux across the 25-μm-thick Pd membrane 50 during exposure to gas mixtures containing 50% $H_2$ and 0%, 0.05%, 0.5%, 1%, 2%, 3%, 4%, and 5% CO at 533 K. The corresponding IRAS spectra are displayed in FIG. 8B, with reference to FIGS. 1A through 8A.

A baseline $H_2$ flux of ~0.031 mol/m$^2$/s is established during the first ~30 minutes of 50% $H_2$/50% $N_2$ exposure at 533 K (FIG. 8A). After introduction of 0.05% $CO_3$ the $H_2$ flux does not change significantly. Increasing the CO concentration from 0.05% to 0.5% results in a small (~1%) decrease in the $H_2$ flux which does not change significantly during the ~15 minutes of exposure to 0.5% CO. The $H_2$ flux is reduced to ~98% of its baseline value by increasing the CO concentration to 1%. Increasing the CO concentration to from 1% to 2% results in a decrease in the $H_2$ flux and, in contrast to the behavior with CO concentrations less than 2%, the $H_2$ flux decreases with increasing CO exposure time during exposure to 2% CO. This transient decrease in the $H_2$ flux was observed during exposure to CO concentrations of 2% and higher and became more severe at higher CO concentrations. The $H_2$ flux is reduced to ~80% of its baseline value after exposure to 5% CO for 15 minutes. After exposure to 5% CO for 15 minutes, the CO concentration in the retentate gas was reduced to 0% and the membrane was exposed to the 50% $H_2$/50% $N_2$ retentate gas mixture for 40 minutes. The $H_2$ flux increased slightly immediately after reducing the CO concentration in the retentate gas from 5% to 0%, but then began to decrease over time to ~75% of its baseline value after 40 minutes of exposure to 50% $H_2$/50% $N_2$. These results indicate that the Pd membrane 50 is irreversibly deactivated by exposure to CO concentrations greater than 1% at 533 K.

Figure 8B:
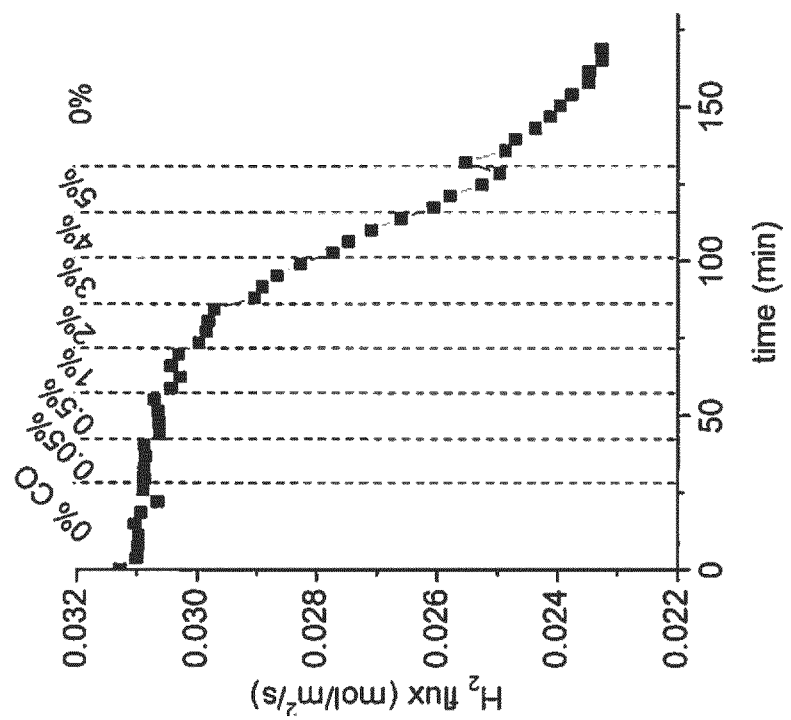
FIG. 8B is a graph illustrating IRAS spectra collected during exposure of the 25-µm-thick Pd foil membrane to 50% $H_2$ and 0%, 0.05%, 0.5%, 1%, 2%, 3%, 4%, and 5% CO at 533 K, according to the embodiments herein.
Figure 9:
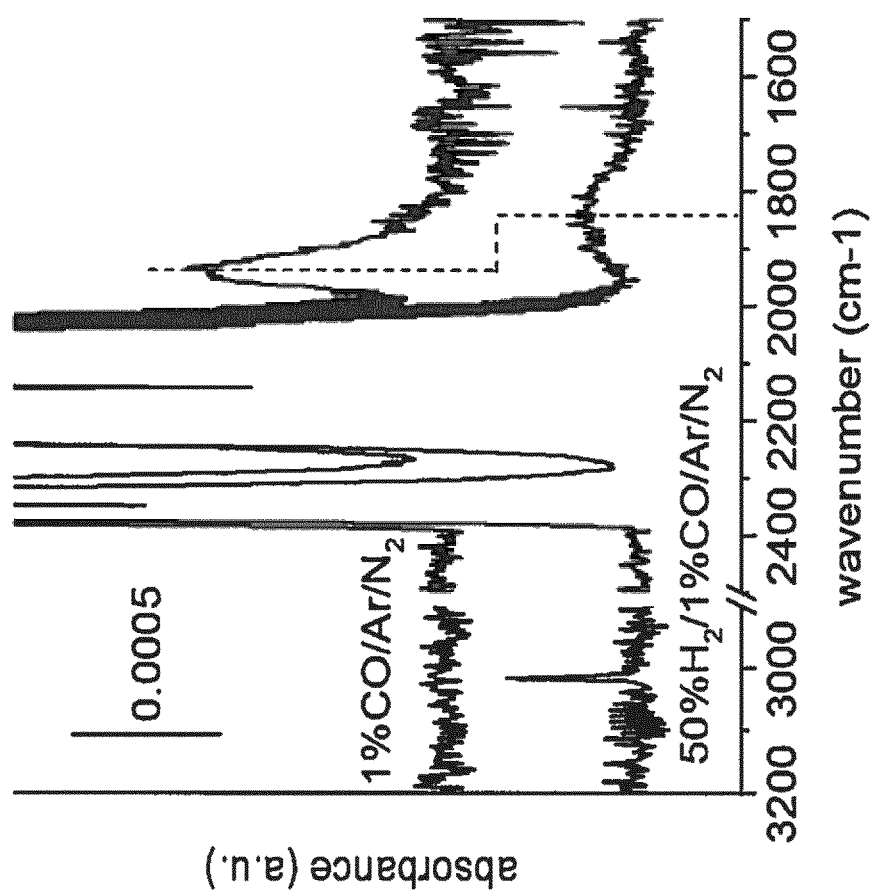
FIG. 9 is a graph illustrating IRAS of a 25-µm-thick Pd foil membrane during exposure to a gas mixture composed of 1% CO without $H_2$ (1% $CO/Ar/N_2$) and with 50% $H_2$ (50% $H_2$/1% $CO/Ar/N_2$) at 533 K, according to the embodiments herein.
Figure 10B:
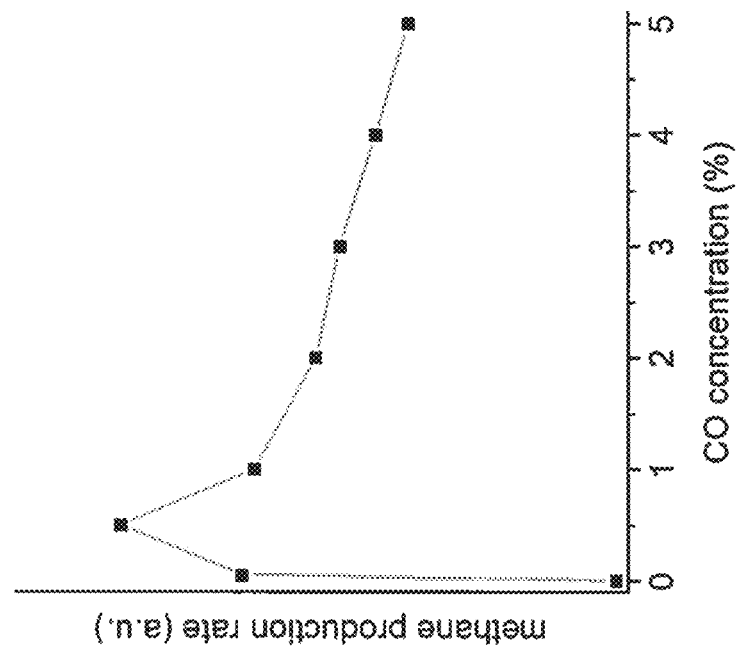
FIG. 10B is a graph illustrating gas-phase methane production rate, estimated from the integral area of the band at 3017 $cm^{-1}$ in FIG. 10A, versus CO concentration in the retentate gas, according to the embodiments herein.
Figure 10A:
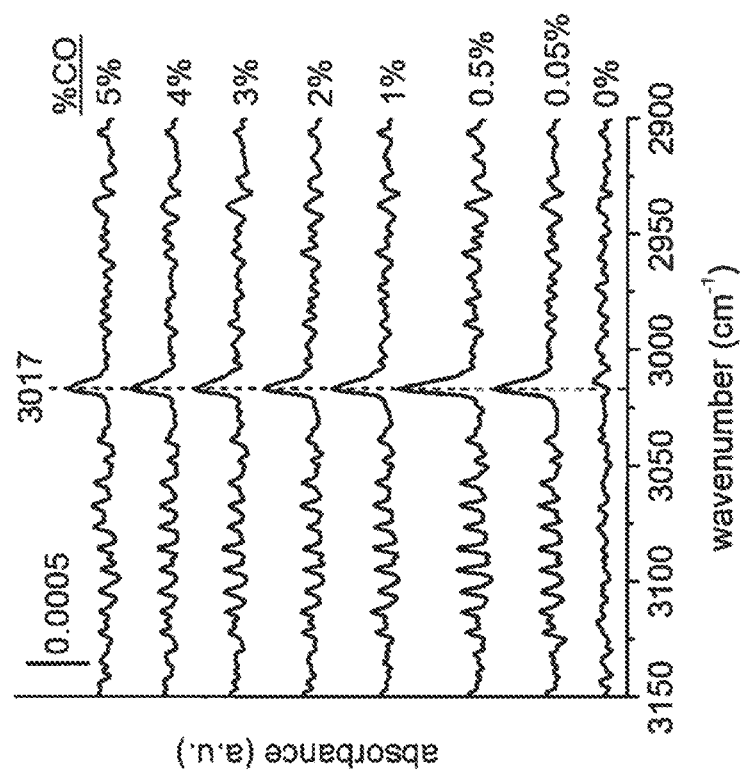
FIG. 10A is a graph illustrating IRAS spectra collected during exposure of a 25-µm-thick Pd foil membrane to 50% $H_2$ and 0%, 0.05%, 0.5%, 1%, 2%, 3%, 4%, and 5% CO at 533 K, according to the embodiments herein.
Figure 11:
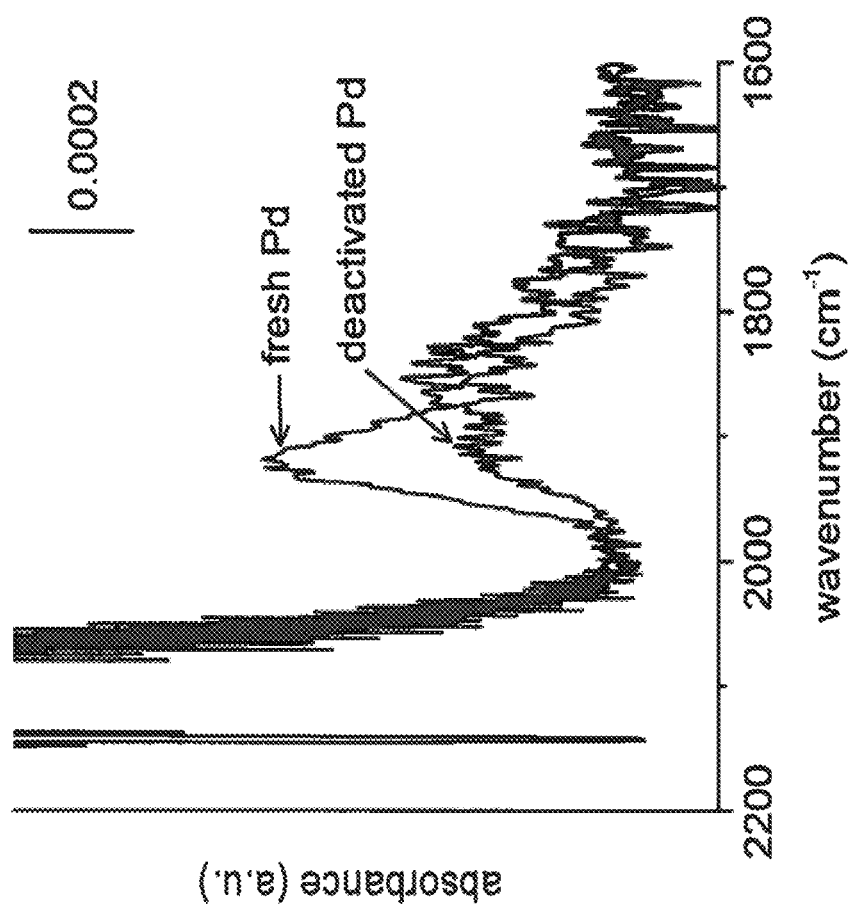
FIG. 11 is a graph illustrating IRAS of a 25-µm-thick Pd foil membrane during exposure to a gas mixture composed of 0.1% CO, 0.9% Ar, and 99% $N_2$ at 533 K before exposure to $H_2$/CO ("fresh Pd") and after deactivation of the membrane by exposure to $H_2$/CO at 533 K ("deactivated Pd"), according to the embodiments herein.

The IRAS spectra displayed in FIG. 8B were collected while the $H_2$ fluxes shown in FIG. 8B were measured during exposure to gas mixtures containing 50% $H_2$ and 0%, 0.05%, 0.5%, 1%, 2%, 3%, 4%, and 5% CO at 533 K. A band associated with CO adsorbed on the Pd membrane 50 was not detected at the lowest CO concentration (0.05%) in the retentate gas, but a broad band centered at ~1830 cm$^{-1}$ appears during exposure to 0.5% CO. The intensity of this band increases with CO concentration and this band shifts from ~1830 cm$^{-1}$ at 0.5% CO up to ~1850 cm$^{-1}$ at a CO concentration of 5%. Both the position and the shape of this band are significantly different than that during exposure to the same concentration of CO in the retentate gas, but without $H_2$ also present in the retentate gas. FIG. 9, with reference to FIGS. 1A through 8B, shows a comparison of the IRAS spectra collected during exposure to 1% CO in the absence of $H_2$ (1% CO/9% Ar/90% $N_2$), and 1% CO in the presence of 50% $H_2$ (50% $H_2$/1% CO/9% Ar/40% $N_2$) at 533 K. In the absence of $H_2$, there is a sharp band centered at ~1940 cm$^{-1}$ that is associated with CO adsorbed on bridging sites on the surface 51 of the Pd membrane 50. The intensity of this band is significantly reduced by introducing 50% $H_2$ in the feed gas and the position of this band is shifted by nearly 100 cm$^{-1}$ to lower wavenumber (~1850 cm$^{-1}$). The position of this band is consistent with CO adsorbed on three-fold hollow sites on the surface 51 of the Pd membrane 50. These results indicate that hydrogen weakens the strength of CO adsorption on Pd, resulting in a decrease in the CO coverage and a change in the CO adsorption site from bridging in the absence of $H_2$ to three-fold hollow in the presence of $H_2$.

In addition to the surface-adsorbed CO feature in the IRAS spectra, there is another sharp band centered at 3017 cm$^{-1}$ in all the spectra collected during $H_2$/CO exposure displayed in FIG. 8B. This band is more clearly visible in FIG. 10A, which shows the same spectra re-scaled to show the 2900-3150 cm$^{-1}$ region in more detail. The band at 3017 cm$^{-1}$ is most likely associated with gas-phase $CH_4$ and the rovibrational bands in the 3050-3130 cm$^{-1}$ further support this assignment. The $CH_4$ production rate, which can be estimated by the integral area of the gas-phase methane band at 3017 cm$^{-1}$ shown in FIG. 10B, with reference to FIGS. 1A through 10A, increases with CO concentration in the retentate gas up to a maximum at a CO concentration of 1%, and then begins to decrease with increasing CO concentration up to 5%. The band at 3017 cm$^{-1}$ is not present during CO exposure in the absence of $H_2$ (FIG. 9) and must result from reaction of CO with $H_2$. This observation clearly indicates that CO dissociates on the surface of the Pd membrane 50 to form $CH_4$ with a maximum rate of $CH_4$ production observed with a CO:$H_2$ ratio of 1:50.

The observation of gas-phase methane during exposure of the Pd membrane 50 to $H_2$/CO gas mixtures is clear evidence of CO dissociation on the surface 51. In addition to reacting with $H_2$ to form $CH_4$, it is possible that the C atoms produced from CO dissociation are responsible for the membrane deactivation observed in FIG. 8A. The C atoms may decrease the rate of $H_2$ dissociation on the surface, or the C atoms may diffuse into the bulk of the membrane to form a bulk PdC phase which has a lower H atom permeability than Pd. To determine whether the surface structure of the membrane 50 has been irreversibly modified by $H_2$/CO exposure at 533 K, an IRAS spectrum was collected during exposure to a 1% CO/9% Ar/90% $N_2$ gas mixture at 533 K following the hydrogen permeation test shown in FIG. 8A. A comparison of the spectra collected before the membrane testing experiment and after deactivation of the membrane by CO/$H_2$ exposure is displayed in FIG. 11, with reference to FIGS. 1A through 10B. Before exposing the membrane to the $H_2$/CO gas mixture, there is a relatively sharp band centered at ~1920 cm$^{-1}$, which is associated with bridging CO, and a broad tail extending to lower wavenumber. After deactivation of the membrane 50 by exposure to $H_2$/CO, the intensity of the band at 1920 cm$^{-1}$ is significantly reduced indicating a significant reduction in the equilibrium CO coverage. This result clearly indicates that the structure of the surface 51 of the Pd membrane 50 is irreversibly modified by exposure to $H_2$/CO gas mixtures at 533 K, and the CO adsorption strength is much weaker after the membrane is deactivated. This modification of the surface structure, most likely from deposition of C atoms following CO dissociation, influences the adsorption properties of the membrane 50 and may explain the irreversible deactivation of the membrane 50.

FIG. 12, with reference to FIGS. 1A through 11, is a flow diagram illustrating a method 150 according to an embodiment herein. The method 150 comprises providing (151) a membrane 50 in a permeation cell device 10; providing (152) the permeation cell device 10 in a spectroscopic device 90; creating (153) an isolated compartment (e.g., basin 34) within the spectroscopic device 90, wherein the isolated compartment (e.g., basin 34) comprises a seal between the membrane 50 and a portion of the permeation cell device 10; providing (154) a first fluid flow in the permeation cell device 10; and simultaneously performing (155) an infrared-reflection absorption spectroscopic analysis of a surface of the membrane 50 and measuring a trans-membrane fluid permeation rate across the membrane 50. The measuring of the trans-membrane fluid permeation rate may comprise flowing a predetermined amount of permeating fluid through the spectroscopic device 90; and measuring a concentration of the permeating fluid flowing out of the isolated compartment (e.g., basin 34). The measuring of the trans-membrane fluid permeation rate may comprise flowing a predetermined amount of permeating fluid through the permeation cell device 10; and measuring a concentration of the permeating fluid flowing out of the spectroscopic device 90. The method may comprise providing a second fluid flow outside the permeation cell device 10 but inside the spectroscopic device 90; and providing the first fluid flow on any of a permeate side 53 and a retentate side 52 of the membrane 50. The method may comprise switching a direction of permeation from either the isolated compartment (e.g., basin 34) to the spectroscopic device 90 or vice versa. The method may comprise providing the first fluid flow at a pressure of at least 1 atm. The permeation cell device 10 may comprise any of ceramic, plastic, and metal material. The membrane 50 may comprise any of metal, ceramic, ceramic-metal composites, and plastic material.

By simultaneously measuring the rate of $H_2$ permeation across the Pd membrane 50 and analyzing the surface 51 of the membrane 50 by IRAS during $H_2/CO$ exposure, the capabilities of the membrane permeation cell device 50 are demonstrated. CO has a significant effect on the rate of $H_2$ permeation across a Pd membrane 50, which has been attributed to blocking of $H_2$ dissociation sites by weak adsorption of CO and by formation of bulk Pd-carbide phases in previous studies. According to the results achieved by the embodiments herein, C atoms deposited irreversibly on the surface 51 of the Pd membrane 50 from CO dissociation may deactivate the membrane 50 by inhibiting the $H_2$ dissociation reaction on the surface 51.

The embodiments herein provide a spectroscopic membrane permeation cell device 10 that accurately measures rates of $H_2$ permeation across a 25-μm-thick Pd foil membrane 50, detects sub-monolayer coverages of CO on the surface 51 of the membrane 50 at elevated temperatures, and simultaneously measures the rate of $H_2$ permeation across the Pd membrane 50 while detecting CO species adsorbed on the surface 51 of the membrane 50. With the device 10 it is possible to directly correlate microscopic processes on the surface 51 of the membrane 50 to macroscopic gas permeation rates and, in effect, elucidate deactivation mechanisms. By systematically varying the structure or composition of the membrane 50, it is also possible to obtain detailed membrane structure-function relationships that can be used to rationally develop new materials that are more resistant to deactivation. The device 10 may be used to investigate the mechanisms of hydrogenation reactions on the surface 51 of the membrane 50, such as the direct production of $H_2O_2$ from $H_2$ and $O_2$, by changing the direction of permeation and observing the hydrogenation reaction intermediates on permeate side 53 of the membrane 50. The device 10 may be used with any infrared-reflective membrane material and with any gas. It is also possible to use the device 10 with other types of spectroscopy, such as Raman or UV-vis, to gain more information about the membrane/adsorbate system.

Although the device 10 may be used to obtain quality spectra while simultaneously measuring $H_2$ permeation rates, there are many ways in which the device 10 may be modified to improve the quality of the results. For example, a photoelastic modulator may be used to modulate the polarization of the infrared beam. This would subtract the vibrational bands association with gas-phase species from the IRAS spectra and would allow for the detection of surface-adsorbed vibrational bands that would otherwise be obscured by gas-phase vibrations.

The embodiments herein provide a spectroscopic membrane permeation cell device 10, which allows the surface 51 of a metal membrane 50 to be analyzed by IRAS while simultaneously measuring the rate of hydrogen permeation across the membrane 50. Although the rate of hydrogen transport across the membrane 50 is influenced to some extent by concentration gradients in the gas phase, these gradients have a relatively small influence on the transport rates and the measured $H_2$ permeability is in very good agreement with previously reported values. IRAS of the Pd membrane 50 during exposure to $CO/Ar/N_2$ gas mixtures was performed in the 333 to 533 K temperature range to determine whether the permeation cell device 10 could be used to detect species adsorbed on the surface 51 of the membrane 50. Sub-monolayer coverages of surface-bound CO were unambiguously detected on the surface 51 of the membrane 50. Experimentally, the $H_2$ permeation rates across a 25-μm-thick Pd foil membrane 50 were measured while performing IRAS simultaneously during exposure of the membrane 50 to $H_2/CO$ gas mixtures at 533 K. CO concentrations greater than 2% caused an irreversible decrease in the rate of $H_2$ permeation across the membrane 50. IRAS spectra recorded during the deactivation indicate that CO dissociates to form C atoms, and the surface 51 of the Pd membrane 50 is irreversibly modified, which may be the cause of the decrease in the $H_2$ permeation flux across the membrane 50. With this spectroscopic membrane permeation cell device 10, it is possible to correlate microscopic surface processes to macroscopic rates of permeation across the membrane 50.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method comprising:
   providing a membrane in a permeation cell device;
   providing the permeation cell device in a spectroscopic device;
   creating an isolated compartment within the spectroscopic device, wherein the isolated compartment comprises a seal between the membrane and a portion of the permeation cell device;
   providing a first fluid flow in the permeation cell device; and
   simultaneously performing an infrared-reflection absorption spectroscopic analysis of a surface of the membrane and measuring a trans-membrane fluid permeation rate across the membrane.

2. The method of claim 1, wherein measuring the trans-membrane fluid permeation rate comprises:
   flowing a predetermined amount of permeating fluid through the spectroscopic device; and
   measuring a concentration of the permeating fluid flowing out of the isolated compartment.

3. The method of claim 1, wherein measuring the trans-membrane fluid permeation rate comprises:
   flowing a predetermined amount of permeating fluid through the permeation cell device; and measuring a concentration of the permeating fluid flowing out of the spectroscopic device.

4. The method of claim 1, comprising:
providing a second fluid flow outside the permeation cell device but inside the spectroscopic device; and
providing the first fluid flow on any of a permeate side and a retentate side of the membrane.

5. The method of claim 4, comprising switching a direction of permeation from either the isolated compartment to the spectroscopic device or vice versa.

6. The method of claim 1, comprising providing the first fluid flow at a pressure of at least 1 atm.

7. The method of claim 1, wherein the permeation cell device comprises any of ceramic, plastic, and metal material.

8. The method of claim 1, wherein the membrane comprises any of metal, ceramic, ceramic-metal composites, and plastic material.

9. A permeation cell device comprising:
a body component comprising a fluid inlet tube and a fluid outlet tube to permit a fluid flow through the body component;
a wire mesh support structure positioned in the body component;
a non-opaque membrane over the wire mesh support structure;
a pair of compressible gaskets sandwiching the non-opaque membrane; and
a flange retaining the membrane against the wire mesh support structure,
wherein the body component is configured to be positioned within a spectroscopic device, and
wherein the body component is configured to receive a first fluid flow and permit a simultaneous infrared-reflection absorption spectroscopic analysis of a surface of the non-opaque membrane and a measurement a trans-membrane fluid permeation rate across the non-opaque membrane.

10. The permeation cell device of claim 9, wherein the body component comprises any of ceramic, plastic, and metal material.

11. The permeation cell device of claim 9, wherein the non-opaque membrane comprises any of metal, ceramic, ceramic-metal composites, and plastic material.

12. The permeation cell device of claim 9, wherein the wire mesh support structure is configured to provide mechanical support to the non-opaque membrane at a pressure of at least 1 atm.

13. The permeation cell device of claim 9, wherein the pair of compressible gaskets are configured to provide a seal between the non-opaque membrane and the body component to create an isolated compartment within the spectroscopic device.

14. The permeation cell device of claim 9, wherein the flange is configured to provide a uniform compression on the pair of compressible gaskets.

15. The permeation cell device of claim 9, wherein the spectroscopic device is configured to contain a second fluid flow outside the permeation cell device but inside the spectroscopic device, and wherein the fluid inlet tube and a fluid outlet tube are configured to permit the first fluid flow on any of a permeate side and a retentate side of the non-opaque membrane.

16. The permeation cell device of claim 9, wherein the fluid flow comprises any of hydrogen and helium gas.

17. A system comprising:
a permeation cell device comprising:
a body component;
a wire mesh support structure positioned in the body component;
a membrane over the wire mesh support structure;
a pair of compressible gaskets sandwiching the membrane; and
a flange compressing the membrane;
a spectroscopic device containing the permeation cell device; and
at least one mechanism to simultaneously perform an infrared-reflection absorption spectroscopic analysis of a surface of the membrane as a fluid permeates on the membrane and a measurement a trans-membrane fluid permeation rate across the membrane.

18. The system of claim 17, wherein the wire mesh support structure is configured to provide mechanical support to the membrane at a pressure of at least 1 atm.

19. The system of claim 17, wherein the permeation cell device and the spectroscopic device collectively create a pair of separate isolated compartments.

20. The system of claim 17, wherein the body component comprises a material that is non-permeable to the fluid.

* * * * *